UNITED STATES PATENT OFFICE.

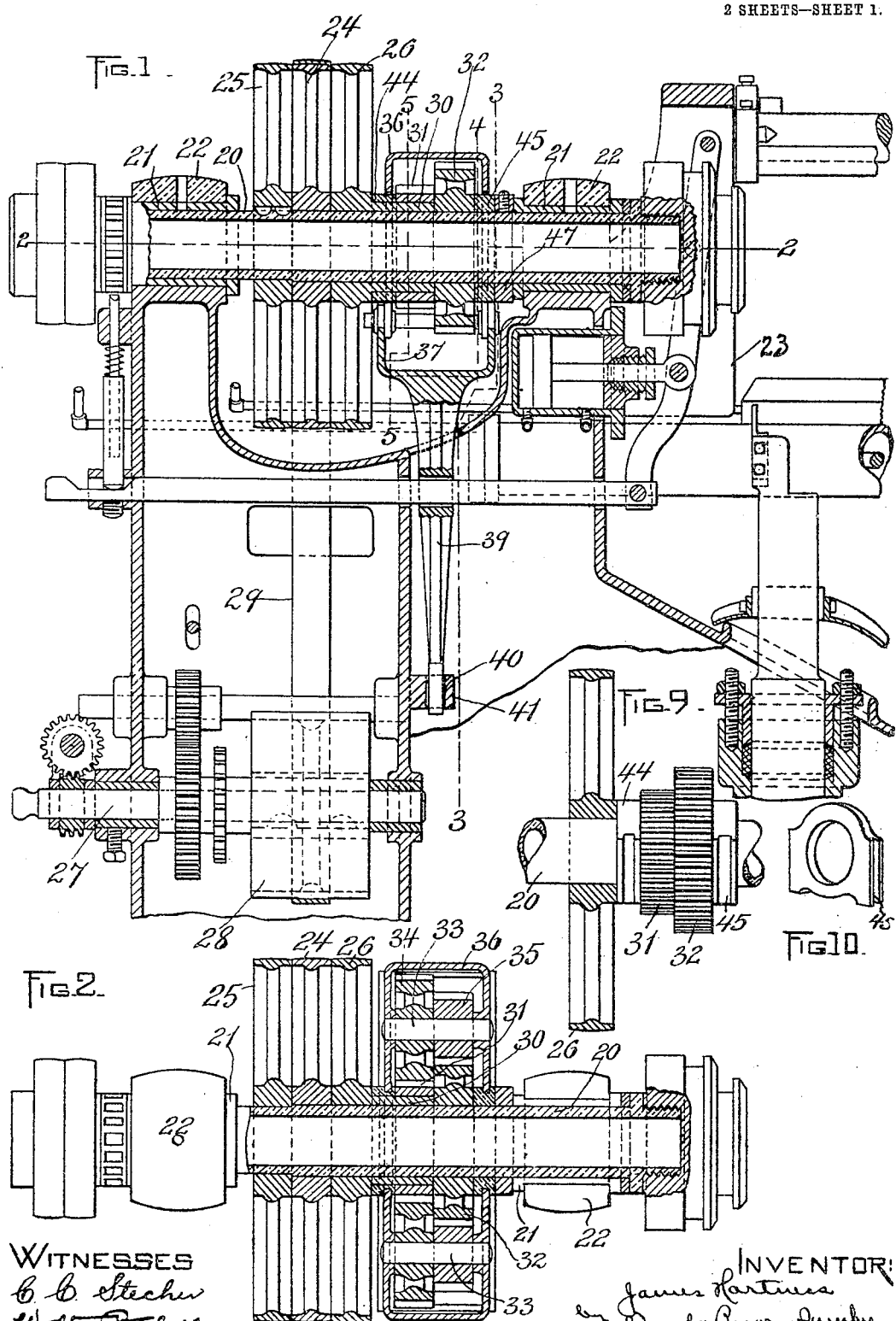

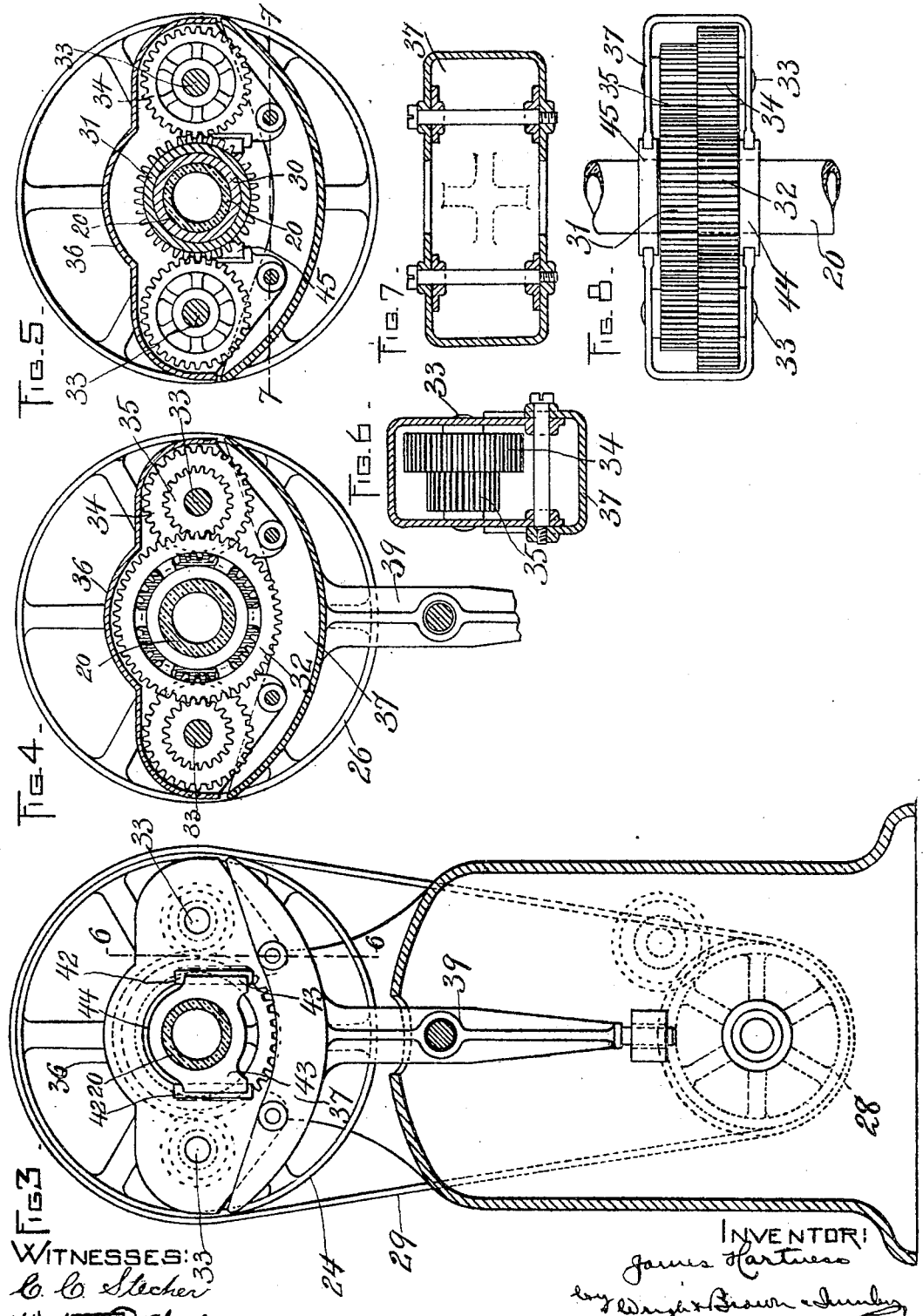

JAMES HARTNESS, OF SPRINGFIELD, VERMONT.

BALANCED DRIVE FOR LATHES.

No. 800,571.            Specification of Letters Patent.            Patented Sept. 26, 1905.

Original application filed March 20, 1901, Serial No. 52,043. Divided and this application filed September 17, 1904. Serial No. 224,864.

*To all whom it may concern:*

Be it known that I, JAMES HARTNESS, of Springfield, in the county of Windsor and State of Vermont, have invented certain new and useful Improvements in Balanced Drives for Lathes, of which the following is a specification.

This invention has relation to power-transmitting mechanisms, and has for its object to provide certain improvements therein by means of which the transmission of greater power from a driving element to a driven element may be secured without unduly increasing the strain on the transmitting-gears.

The invention is designed more especially for employment in a lathe such as shown in Letters Patent No. 739,866, granted to me September 29, 1903, of which said Letters Patent this is a division.

Referring to the drawings, Figure 1 represents a longitudinal section through the head end of a lathe in which the improved power-transmitting mechanism is employed. Fig. 2 represents a section on the line 2 2 of Fig. 1. Fig. 3 represents a section on the line 3 3 of Fig. 1. Fig. 4 represents a section on the line 4 4 of Fig. 1. Fig. 5 represents a section on the line 5 5 of Fig. 1. Fig. 6 represents a section on the line 6 6 of Fig. 3. Fig. 7 represents a section on the line 7 7 of Fig. 5. Fig. 8 represents an inverted plan view of the back or transmitting gearing with the casing removed. Fig. 9 represents the spindle or driven element with some of the parts thereon. Fig. 10 represents one of the guide-collars.

For the purpose of illustrating the invention as applied to a lathe some of the parts of the lathe are shown in detail; but those not hereinafter referred to form no portion of the present invention and need not be considered in connection therewith.

The hollow lathe-spindle 20, which may be termed the "driven" member or element, is journaled in the bushings 21 21 and the boxes 22 22 in the head-stock 23. It has upon it the loose pulley 24, the pulley 25, which is keyed to it, as shown, and the pulley 26, which is loosely mounted thereon. The prime power-shaft 27 receives its power from any suitable source and is equipped with the elongated pulley 28, which may be connected to any one of the pulleys 24 25 26 by an endless belt 29. When the belt is on pulley 24, the spindle is dead; but when the belt is shifted to pulley 24 the spindle rotates therewith.

The back gearing or speed-reducing gearing is connected to and actuated by the pulley 26, which for some purposes may be termed the "driving" member or element. The said pulley has an elongated hub 30, upon which is keyed a small gear or pinion 31. Keyed or otherwise rigidly secured upon the spindle is a relatively larger gear 32, which is placed in juxtaposition to the pinion 31. On either side of the spindle 20 there is a shaft 33. The shafts are parallel with each other and with the axis of the spindle, and rigidly secured to each are two reducing-gears 34 35, which intermesh, respectively, with the pinion 31 and the gear 32, so that from the pulley 26 power may be transmitted to the spindle 20 through the pinion 31, the gears 34, the gears 35, and the gear 32, the speed being reduced in transmission, so that the spindle rotates at a much slower speed than the pulley 26. In order that power may be equally transmitted through the two trains of gear to effect a balanced drive, the shafts 33 33 are so mounted as to yield more or less in a line circumscribed about the axis of the spindle, so that the gears carried thereby may secure an equal bearing upon the gears with which they intermesh. To this end the two shafts 33 are secured in a combined hood and holder 36, as best shown in Figs. 4 and 5. This hood or holder is supported by the shafts 33 and by the engagement of the gears carried thereby with the pinion 31 and gear 32. The lower portion of the hood or casing 37, which is bolted thereto, has a depending arm 39, which projects loosely into an aperture 40, formed in a lug 41 on the framework of the lathe. The hood or casing or "support," as it may be termed, is provided with parallel inner guides 42, which engage complemental guides 43, formed on collars 44 45, respectively, as shown in Figs. 8, 9, and 10. The collar 44 is loosely supported upon the hub 30 of the pulley 26, and the collar 45 is loosely supported on the spindle. A collar 47 is secured to the spindle to hold the parts against movement axially of the spindle.

From this description it will be observed that the holder or support has a limited movement relatively to the spindle, so that the gears may be all caused to simultaneously engage the teeth of their intermeshing gears, whereby the work will be equally performed by the gears on both sides of the spindle. It will be observed that I have thus provided transmitting-gearing by which greater driving power may be transmitted to the spindle without unduly increasing the strain on the driving-gears or the spindle-bearings.

Heretofore it has been customary to employ a large driving or "bull" gear on the spindle, whereby the tooth speed of the gear was relatively great. By employing the small gears the tooth speed of the gear 32 is greatly reduced, and at the same time I provide a balanced drive which eliminates the strain on the bearing and reduces the strain on the gear-teeth.

It is obvious that the exact location of the transmitting-gears of the back gearing is immaterial and that they may be above or below the spindle with equal facility. The holder or support itself being in the form of a shield or hood protects the gears from chips.

I have illustrated on the drawings several features of a lathe which are not herein described, as they form no part of the present invention. For a description thereof reference may be had to my Letters Patent No. 739,866, hereinbefore referred to.

Having thus explained the nature of the invention and described a way of constructing and using the same, although without attempting to set forth all of the forms in which it may be made or all of the modes of its use, I declare that what I claim is—

1. The combination with a driving element and a driven element arranged substantially in axial alinement, a gear on each of said elements, independent trains of gearing between said gears, and means whereby the driving power is equalized between the independent trains of gearing.

2. The combination of a driven element, a driving element, independent trains of gearing between the driving element and the driven element, and means whereby the driving power is equalized between the independent trains of gearing.

3. The combination of a work-carrier, a power-shaft, and a balanced drive mechanism for said work-carrier actuated by said shaft and transmitting power in two courses to said work-carrier.

4. The combination of a driven element, a gear fast thereon, independent trains of gearing actuating said gear, a single source of power for said trains of gearing, and means whereby the power is transmitted equally to the gear by said trains of gearing.

5. The combination of a driven member, a gear fast on said driven member, loosely-mounted balanced driving mechanism transmitting power to said gear on opposite sides thereof, a loosely-mounted support for said driving mechanism, and a single source of power for said driving mechanism.

6. The combination of a driven member, a gear fast on said driven member, loosely-mounted means engaging said gear at diametrically opposite points and having provisions for transmitting an equal amount of power thereto, a loosely-mounted support for said means, and a single source of power for said transmitter means.

7. The combination of a driven member, a driving-gear loose relatively to said driven member, a driven gear fast on said driven member, and two loosely-supported independent trains of gears for transmitting power from the driving-gear to the driven gear.

8. The combination of a driven member, a driving-gear loosely mounted with respect to said driven member but in substantially axial alinement therewith, a driven gear fast on said driven member, independent trains of gears for transmitting power from the driving-gear to the driven gear, and a relatively loose support for said trains of gears.

9. The combination of a driven member, a driving-gear loosely mounted with respect to said driven member but in substantially axial alinement therewith, a driven gear fast on said member, a loosely-mounted support, and two independent trains of gears located on said support and having a limited translatory movement to equalize the driving power transmitted thereby from the driving-gear to the driven gear.

10. The combination of a driving-gear, a driven gear, independent automatically-adjusted trains of gears for transmitting power from the driving-gear to the driven gear, and a loosely-mounted hood for inclosing and supporting said independent trains of gears.

11. The combination of driving and driven members, a driving-gear connected to the driving member, a driven gear connected to the driven member, a hollow support inclosing said gears, two independent trains of power-transmitting devices for transmitting motion from the driving-gear to the driven gear, said devices being located within said hollow support, and means whereby the driving power is transmitted to the driven gear equally through said devices.

12. The combination of a spindle, a driving-gear loose on said spindle, a driven gear fast on said spindle, balanced power-transmitting devices for transmitting power from the driving-gear to the driven gear, a loosely-mounted support for said devices, and means for holding said support against movement longitudinally of the axis of the spindle.

In testimony whereof I have affixed my signature in presence of two witnesses.

JAMES HARTNESS.

Witnesses:
D. S. BROWNELL,
F. B. GILL.